United States Patent [19]
Spangler et al.

[11] 3,911,746
[45] Oct. 14, 1975

[54] TIME AND CONDITION DATA LOGGER

[75] Inventors: Ayers M. Spangler, Bladensburg; Luigi A. Vagnoni, Hyattsville, both of Md.

[73] Assignee: The United States of America as represented by the Secretary of the Navy, Washington, D.C.

[22] Filed: Apr. 27, 1973

[21] Appl. No.: 355,102

Related U.S. Application Data

[63] Continuation-in-part of Ser. No. 174,347, Aug. 24, 1971, abandoned.

[52] U.S. Cl. ............... 73/343.5; 73/362 AR; 346/35
[51] Int. Cl.² ............................................ G01D 7/00
[58] Field of Search ............ 73/343.5, 362 AR, 359, 73/344, 391; 324/65 R; 340/233; 346/32, 35

[56] References Cited
UNITED STATES PATENTS

| | | | |
|---|---|---|---|
| 2,835,856 | 5/1958 | Moseley | 346/32 |
| 3,167,378 | 1/1965 | Talle | 346/32 |
| 3,318,151 | 5/1967 | Behrendt | 73/343.5 |
| 3,509,768 | 5/1970 | Reynolds | 73/341 |
| 3,512,167 | 5/1970 | Weinstein | 73/343.5 |

*Primary Examiner*—S. Clement Swisher
*Assistant Examiner*—Denis E. Corr
*Attorney, Agent, or Firm*—R. S. Sciascia; J. A. Cooke

[57] ABSTRACT

A condition vs. time data logger for recording on a digital elapsed-time meter and a strip chart recorder, the time and duration of a predetermined condition on an object or in an environment to be monitored. Temperature is detected by a thermistor in a bridge circuit, the signal is then amplified, and applied to a plurality of comparators which compare the signal representative of temperature to reference voltages individually preset at each comparator. If the predetermined condition is met, and the signal matches the reference voltage, a comparator actuates a relay which energizes an elapsed time digital meter and displaces the pen on a strip chart recorder, thus logging the time and the duration of a condition desired to be recorded.

8 Claims, 1 Drawing Figure

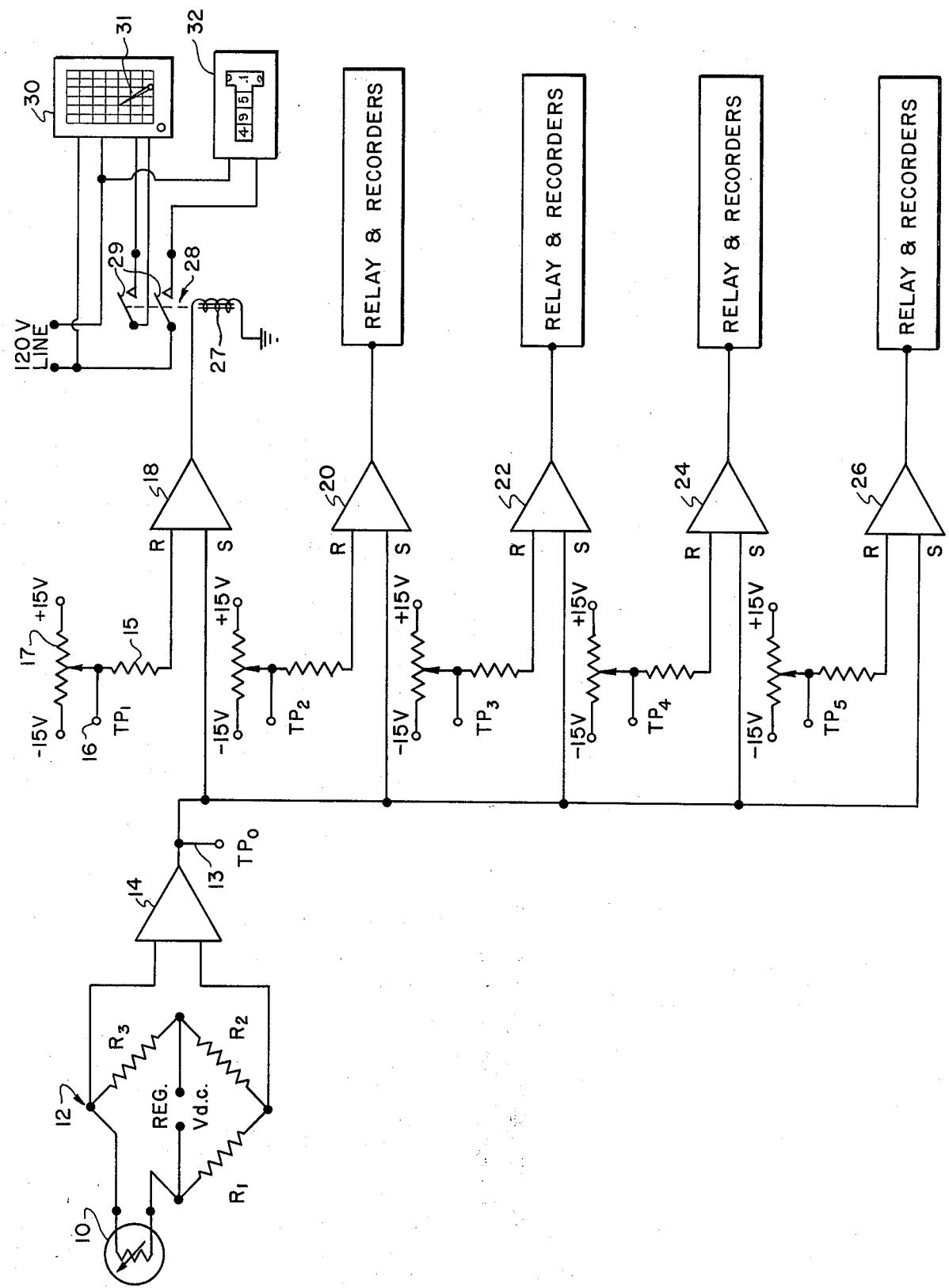

TIME AND CONDITION DATA LOGGER

CROSS-REFERENCES TO RELATED APPLICATIONS

This is a continuation-in-part of application Ser. No. 174,347, filed August 24, 1971 now abandoned.

BACKGROUND OF THE INVENTION

This invention relates generally to time and condition data recording and more particularly to a system that records a time against condition profile giving time and duration of a condition exceeded or within predetermined ranges.

Several methods have been heretofore proposed to record the time and duration of temperatures and other conditions and most of these involve observation of a measuring device and manually recording the time and duration of the event. These prior art methods have the obvious disadvantage that an observer must be present at all times to observe and record the data, however, this method is tedious and unduly consumptive of costly manpower. Often it is not even possible to observe and record data particularly when one desires to obtain data within a container to be shipped to a remote point or in a closed storage area. Another shortcoming of the manual method is that a temperature change may be missed unless constant observation of the measuring device is maintained.

Another method used to obtain the time and duration of conditions is photography of a data board on which is mounted display devices and a clock. The film must then be developed and observed, an obviously expensive, tedious and time consuming procedure.

Also strip chart recorders are commonly used to record conditions against the time of running of the strip chart. While this method is convenient to collect data, such as temperature, pressure, etc., reading and interpreting the chart to obtain the time and duration of the condition is inconvenient, tedious and time consuming.

SUMMARY OF THE INVENTION

Accordingly, one object of this invention is to provide a new and improved physical condition measuring device that conveniently records time and duration of the condition.

Another object of the invention is to provide a data logger that records the time and duration of an event and is easy and convenient to interpret for the time data.

A further object of the instant invention is to provide a data logger that will record the time and duration of an exceeded preset condition.

Still another object of the present invention is to provide a data logger that will record the time and duration of an exceeded temperature condition.

A still further object of this invention is to provide a time and temperature data logger that will record the time and duration that temperature was within a predetermined range.

Still another object of the instant invention is to provide a time and temperature data logger that will record the time and duration of temperatures automatically without constant observation.

A further object of the instant invention is to provide a condition responsive device that has linear readout from a non-linear sensor. Briefly, these and other objects of the present invention are attained by the use of a temperature responsive detector such as a thermistor, or the like which forms one leg of a resistive Wheatstone bridge circuit. The bridge circuit output voltage, indicative of a temperature, is electronically amplified and coupled to a plurality of comparators which compare the sensed voltage to a preset reference voltage, a representative of a desired temperature. When a comparator produces an output, indicating that the predetermined temperature or condition has been reached and exceeded, this output signal actuates a relay energizing an elapsed time meter and displaces the pen on a running strip chart recorder graduated in time. When the temperature goes below the predetermined temperature, the elapsed time meter and the pen displacement is interrupted by the opening of the relay contacts. Thus, the time and the duration of the condition is recorded on the strip chart recorder and the elapsed time meter, which are easily read as regard to time and duration.

BRIEF DESCRIPTION OF THE DRAWINGS

A more complete understanding of the invention and many of the attendant advantages thereof will be readily appreciated as the same becomes better understood by reference to the following detailed description when considered in connection with the accompanying drawing wherein:

The FIGURE is a block diagram and partial schematic of the time and temperature data logger of the present invention.

DESCRIPTION OF THE PREFERRED EMBODIMENT

Referring now to the drawing there is shown in the FIGURE a temperature sensor 10 such as a thermistor, or the like, connected as one arm of a bridge 12. The other arms of the resistance Wheatstone bridge are shown as R1, the resistance of which matches thermistor 10, and R2 and R3 whose resistance is chosen to provide reasonable voltage output and impedance matching to an amplifier. The bridge is supplied with a regulated d.c. voltage at the intersection of the sensor 10 arm and R1 and the intersection of arms R2 and R3. The output of bridge 12 taken at the opposite intersections of the arms is coupled to the input of a differential amplifier 14.

The output of differential amplifier 14 is common fed to a signal input "S" of each of a plurality of comparators 18, 20, 22, 24 and 26. Connected to another input "R" of each comparator is a reference voltage network comprising a decoupling resistor 15, a test point 16, and a potentiometer 17 connected between voltage sources of −15V and +15V. The comparators and their associated circuitry are all substantially similar and therefore only comparator 18 need be described in detail hereinafter.

The output of comparator 18 is connected to an energizing coil 27 of a relay 28 having a plurality of switch contacts 29 shown in the normally-open position. As can be seen in the schematic diagram, one set of relay contacts 29 control the continuity of the 120 volt line source connected to an elapsed time meter 32, and the other set of relay contacts 29 control the displacement of a marker 31 on a strip chart recorder 30, such as a multichannel event recorder having an integral marker circuit (not shown).

In operation, the Wheatstone bridge 12 comprising temperature sensor 10 and resistors R1, R2 and R3, powered by a regulated d.c. voltage power supply, is set up as a bridge circuit. The temperature sensor 10 may be a thermistor or other thermo-resistive type element which changes its resistance concomitant with a change in temperature on an object or in an environment to be measured. Therefore, when a change in temperature occurs, bridge 12 becomes unbalanced and its voltage output to amplifier 14 changes. Amplifier 14 is a typical operational amplifier connected as a differential amplifier such that it will amplify d.c. signals.

The amplified d.c. voltage from amplifier 14 is then fed to the inputs "S" of the plurality of common connected comparators 18, 20, 22, 24 and 26. Each comparator also receives a selectively adjustable reference voltage at input "R" which is obtained and pre-set from a resistance network by adjusting a variable resistance potentiometer 17 while monitoring the voltage at test point 16 (TP1). Thus the comparator 18 compares the signal voltage from amplifier 14 with the d.c. reference voltage. The comparators are adjusted such that there will be no output from comparator 18 for example until the signal input exceeds a threshold value. An increase in temperature at thermistor 10 causes an increase in the magnitude of the signal from amplifier 14 and when this signal at input S equals or exceeds the value of a reference voltage at input R comparator 18 will produce an output to relay 28. This relay 28 will be actuated continually when the temperature is at and above the predetermined value. The sensitivity of the circuit is such that a very small temperature variation is sufficient to energize the relay coil 27 to close relay contacts 29. When the contacts close the marker 31 is caused to be displaced upscale and print on the strip chart recorder 30 and power is applied to the elapsed time meter 32.

When energized, the elapsed time meter 32 operated by a clock motor, is set in operation and advances the numerals on a digital readout counter, calibrated in hours and tenths of hours to indicate the duration that a temperature exceeded the set point. Strip chart recorder 30 also has a clock motor which continuously advances the strip chart in a vertical direction, and the marker 31 merely marks the chart when an event occurs. As is well known in the art, the strip chart may be marked in hours of the day and days of the month so that observation of the chart after a long period of recording time will indicate the beginning time and the duration that the temperature exceeded a set point.

In further explanation as to how this system may record the time and duration of a temperature event, the procedure for calibration of the instrument will be discussed. First the thermistor 10 may be removed from the bridge circuit 12 and replaced with a variable resistance decade box set to simulate the resistance of the thermistor for a temperature selected. By switching in a resistance as obtained from the thermistor data sheet for a particular temperature, the output of amplifier 14, measured at test point 13 (TP0) will represent the selected temperature. The voltage obtained at TP0 is noted, and the reference voltage for comparator 18, at test point 16 (TP1) is adjusted by potentiometer 17 to obtain an equal magnitude voltage as obtained at TP0. Similarly, this same procedure is used to set the reference voltages for comparators 20, 22, 24 and 26 at TP2, TP3, TP4, and TP5 respectively to any voltage corresponding to the resistances selected on the resistance decade box which simulates the resistance of a thermistor 10.

As an example, the reference voltage may be set to correspond to a temperature of 100° F for comparator 18, to 110° F for comparator 20, to 120° F for comparator 22, to 121° F for comparator 24 and to 130° F for comparator 26.

As will be obvious from the aforementioned, when thermistor 10 is replaced into the bridge circuit 12 and is exposed to a temperature rising from the ambient temperature, the recorders associated with comparator 18 will be actuated when a temperature 100° F is reached. The recorders associated with comparator 20 will be actuated when a temperature of 110° F is reached. Considering comparator amplifier 22 and 24 together, which are set to actuate recorders at 120° F and 121° F respectively, it is apparent that the difference in times shown by the elapsed time meters will indicate the duration of time that the temperature was between 120° F–121° F, and the strip chart recordings may be compared to show when the temperature occurred. To determine the time and duration that the temperature was within a range of 110° F to 130° F the readings found on the strip chart recordings and elapsed time meters associated with comparator 20 and comparator 26 may be compared. Data on other ranges may be obtained by observing and comparing readings on the elapsed time meters and strip chart recordings associated with any other combination of comparators. Furthermore, the comparators may be preset to actuate at any predetermined temperature or condition desired.

It will be apparent that the apparatus of the herein described invention achieves recording of the time and duration of a temperature event by the use of elapsed time meters, strip chart recorders and multichannel chart recorders. It will also be apparent that these indicators may be replaced by any other type indicator such as a light or bell for alarm purposes. Furthermore, the thermistor may be replaced by any other type temperature sensor such as a thermocouple (eliminating the power source) for example, and for measuring conditions other than temperature, the thermistor may be replaced by any condition responsive sensor such as a strain gage, a pressure detector, or the like.

An equally important novel feature of this invention is the fact that a number of discrete temperatures or other conditions (depending on the number of comparator amplifiers employed) may be obtained from one sensor. Furthermore, the problems relating to the non-linearity of temperature versus resistance of thermistors are eliminated because each of a plurality of comparators may have reference voltages set to indicate temperatures in linear steps, irrespective of the non-linearity of the thermistor.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. An apparatus for linearly producing a record of time versus a series of events profile comprising:

event detector means positionable in an environment to be monitored for producing a first output signal indicative of said event;

a Wheatstone bridge circuit connected to said event detector means, said event detector means forming an arm thereof;

amplifier means connected to said Wheatstone bridge for producing a second output signal in response to said first output signal;

a plurality adjustable voltage source means for producing a plurality of variable reference voltages;

a plurality of comparator means for comparing said second output signal produced by said amplifier means and said plurality of variable reference voltages to produce one or more third output signals whenever said second output signal exceeds any of said plurality of reference voltages;

a plurality of switching means connected to and activated by said third output signals; and multichannel event recording means connected to and activated by said switching means for recording an elapsed time of said series of events indicated by said plurality of switching means in a series of linear steps irrespective of the nonlinearity of said event detector means to produce a linear measurement of time versus said series of events profile.

2. The event measuring apparatus of claim 1 wherein said recording means include an elapsed time meter.

3. The event measuring apparatus of claim 1 wherein said recording means includes a strip-chart recorder.

4. The event measuring apparatus of claim 1 wherein said recording means comprises both an elapsed-time meter and a strip chart recorder.

5. The event measuring apparatus of claim 1 wherein said switching means is an electro-magnetic relay.

6. The event measuring apparatus of claim 1 wherein said event is temperature.

7. The event measuring apparatus of claim 6 wherein said event detector means is a thermistor.

8. The event measuring apparatus of claim 1 including an elapsed time meter connected to and actuated by said switching means.

* * * * *